United States Patent [19]

Schott et al.

[11] Patent Number: 4,938,302
[45] Date of Patent: Jul. 3, 1990

[54] TRACTOR POWER-TAKEOFF ENGAGEMENT LIMIT

[75] Inventors: Allan N. Schott, Warren; Mark B. Oleski, Winnipeg, both of Canada

[73] Assignee: Ford New Holand, Inc., New Holland, Pa.

[21] Appl. No.: 417,420

[22] Filed: Oct. 5, 1989

[51] Int. Cl.⁵ .............................................. B60K 25/00
[52] U.S. Cl. ................................... 180/53.1; 180/315; 74/529
[58] Field of Search .................. 180/53.1, 315; 74/529

[56] References Cited

U.S. PATENT DOCUMENTS

| | | | |
|---|---|---|---|
| 3,633,699 | 1/1972 | Bishop et al. | 180/53.1 |
| 3,731,471 | 5/1973 | Bening | 180/53.1 |
| 4,051,915 | 11/1977 | Behrens | 180/53.1 |

*Primary Examiner*—Kenneth R. Rice
*Attorney, Agent, or Firm*—Larry W. Miller; Frank A. Seemar; Darrell F. Marquette

[57] ABSTRACT

An interlock mechanism for use on a tractor to limit the engagement of the tractor power-takeoff only when the tractor engine is running at or below a predetermined speed of operation is disclosed wherein an interlock clip interconnects the control levers for the engine throttle and the power-takeoff engagement control such that the power-takeoff control lever is locked against moving into an on position whenever the throttle control lever has been moved to a predetermined position. The clip includes a first member having a cam surface thereon engageable with the throttle control lever and a second member movable into the path of movement of the PTO control lever whenever the first member is moved into a lockout position by the throttle control lever. The clip also includes a spring to permit yielding movement of the first and second members under conditions where the PTO control lever is moved into the on position and the throttle is subsequently moved into the predetermined position.

16 Claims, 4 Drawing Sheets 4,938,302

TRACTOR POWER-TAKEOFF ENGAGEMENT LIMIT

BACKGROUND OF THE INVENTION

The present invention relates generally to tractor controls preventing engagement of a power-takeoff assembly when the engine speed exceeds a predetermined amount and, more particularly, to an interlock between the engine throttle and the power-takeoff engagement control to restrict engagement of the tractor power-takeoff.

An inherent problem with typical tractor power-takeoff drives on agricultural tractors is that the PTO clutch is vulnerable to operator abuse either by engaging the clutch to start the power-takeoff with the engine running at maximum speed and/or by the engagement of the clutch with a stalled output receiving the rotational power from the PTO. Current PTO control designs require the provision of a clutch with sufficient capacity to dissipate peak energies associated with a full stall and with full speed PTO clutch engagement. This requirement necessitates the specification of a clutch in the power-takeoff design which is much larger and more expensive than that required for normal, low-speed, moderate load, PTO engagements and continued operations.

It would be desirable to provide a means for limiting the engagement of the tractor power-takeoff so that the PTO clutch can only be engaged at times when the engine speed is at a reasonable level, thereby eliminating the need to an oversized clutch in the power-takeoff driveline. Since the energy absorbed by the PTO clutch is proportional to the square of the rotational input speed, limiting the input speed at which the clutch is to be engaged to two-thirds of the rated engine speed would result in the energy requirements of the PTO clutch to be reduced by a factor of greater than fifty percent. Accordingly, it would be desirable to provide a tractor control interlock preventing the engagement of the tractor power-takeoff when the speed of operation of the engine is greater than a reasonable, predetermined amount.

SUMMARY OF THE INVENTION

It is an object of this invention to overcome the aforementioned disadvantages of the prior art by providing an interlock preventing engagement of the tractor power-takeoff when the engine is running at a speed of operation greater than a predetermined speed.

It is another object of this invention to provide a mechanical lockout between the throttle control lever and the PTO engagement lever that will prevent an engagement of the tractor power-takeoff when the engine throttle has been moved to a predetermined position.

It is a feature of this invention to provide a means of allowing engagement of the tractor power-takeoff only when the tractor engine is running at or below a predetermined speed of operation.

It is an advantage of this invention that engagement of the tractor power-takeoff will not be permitted if the engine is running faster than the predetermined speed of operation.

It is another feature of this invention that the clutch size required for power-takeoff drives can be optimized.

It is another advantage of this invention that any given power-takeoff clutch design can be utilized with a greater power-takeoff power level.

It is still another object of this invention to provide a mechanical lockout incorporating a spring-loaded clip operable to block the movement of the PTO engagement lever from the off position to the on position whenever the throttle control lever has been moved to a predetermined position.

It is still another feature of this invention that movement of the engine throttle is unrestricted once the power-takeoff has been engaged.

It is still another advantage of this invention that movement of the PTO control lever from the off position to the on position is mechanically restricted anytime the throttle control lever is between a preset position and the maximum engine speed position.

It is a further object of this invention to provide an interlock for a tractor power-takeoff controls limiting the engine speed at which the tractor power-takeoff can be engaged which is durable in construction, inexpensive of manufacture, carefree of maintenance, facile in assemblage, and simple and effective in use.

These and other objects, features, and advantages are accomplished according to the instant invention by providing an interlock mechanism for use on a tractor to limit the engagement of the tractor power-takeoff only when the tractor engine is running at or below a predetermined speed of operation. An interlock clip interconnects the control levers for the engine throttle and the power-takeoff engagement control such that the power-takeoff control lever is locked against moving into an on position whenever the throttle control lever has been moved to a predetermined position. The clip includes a first member having a cam surface thereon engageable with the throttle control lever and a second member movable into the path of movement of the PTO control lever whenever the first member is moved into a lockout position by the throttle control lever. The clip also includes a spring to permit yielding movement of the first and second members under conditions where the PTO control lever is moved into the on position and the throttle is subsequently moved into the predetermined position.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
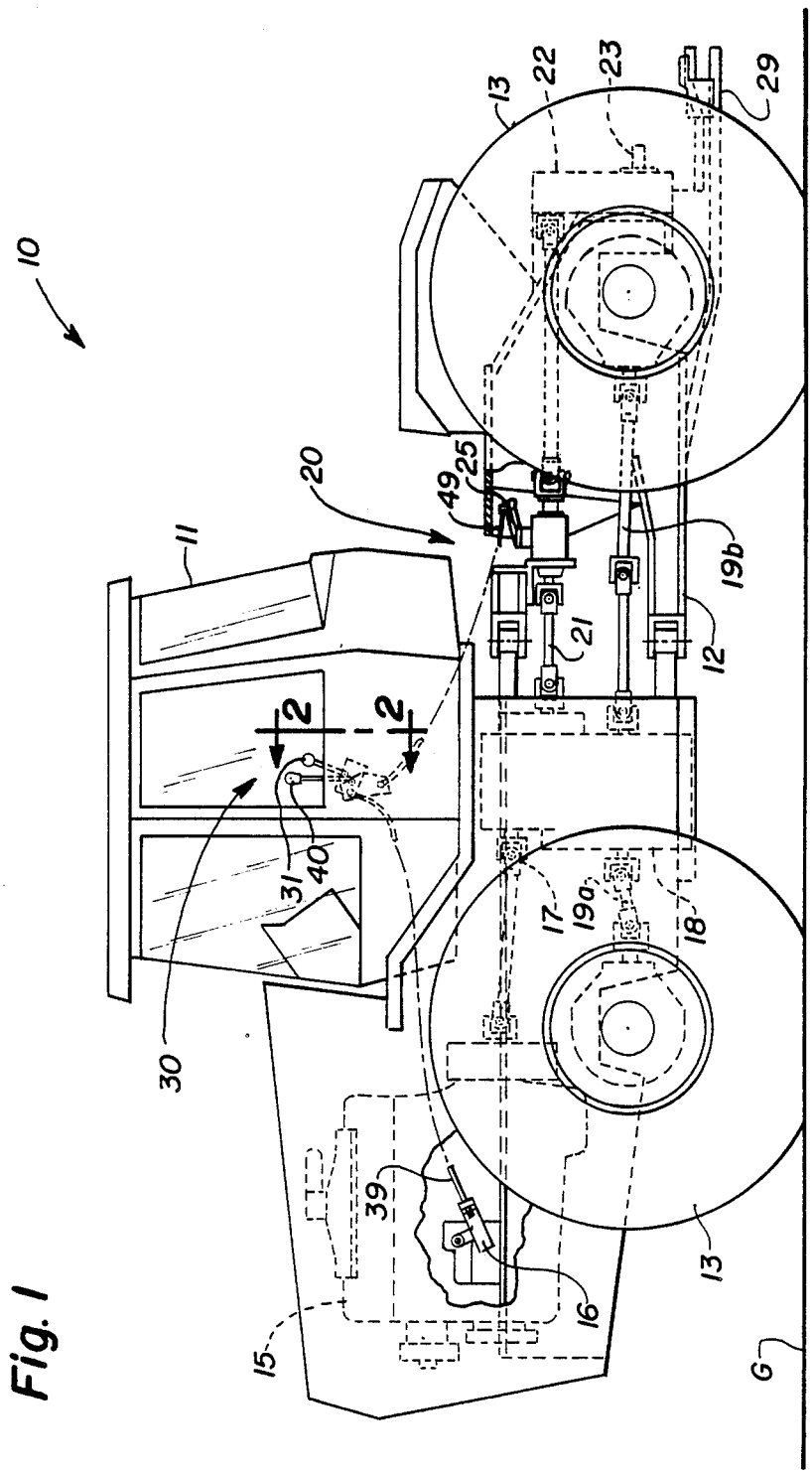
FIG. 1 is a side elevational view of a tractor incorporating the principles of the instant invention.

Referring now to the drawings and, particularly, to FIG. 1, a side elevational view of a tractor incorporating the principles of the instant invention can be seen. The tractor 10 includes an operator's cab 11 mounted on a frame 12 mobilely supported over the ground G by wheels 13. The tractor 10 further includes an engine 15 mounted on the frame 12 to provide operative power for the tractor 10. The engine 15 is provided with a conventional throttle 16 movable to vary the speed of operation of the engine 15 in a known manner. The rotational output of the engine 15 is transferred to a transmission 18 by a shaft 17 where driving power is transferred to the wheels 13 by drive shafts 19a, 19b, and to a power-takeoff assembly 20 via a drive shaft 21.

The power-takeoff assembly 20 shown in FIG. 1 incorporates a transfer box 22 having an output shaft 23 positioned for conventional engagement with an implement to be detachably connected to the hitch 29 in a known and conventional manner. As one skilled in the art will readily realize, the output shaft 23 provides rotational power to the implement (not shown) when connected thereto. The power-takeoff assembly 20 is also provided with an engagement control 25 movably operable to turn the power-takeoff assembly 20 on and off.

Figure 2:
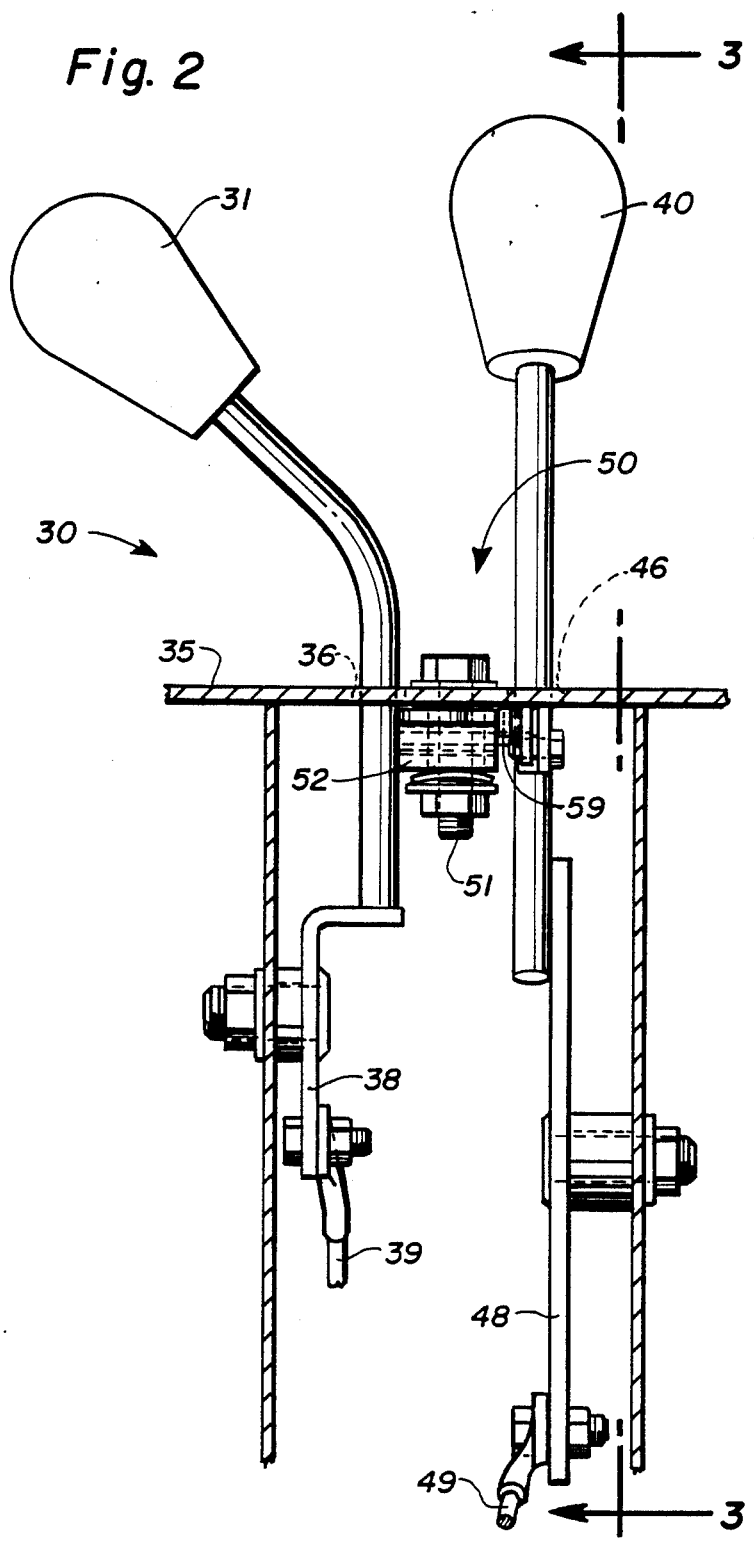
FIG. 2 is an enlarged partial cross-sectional view of the control mechanism in the operator's cab taken along lines 2—2 of FIG. 1 to show a front elevational view of the throttle control lever and the adjacent PTO engagement control lever.
Figure 3:
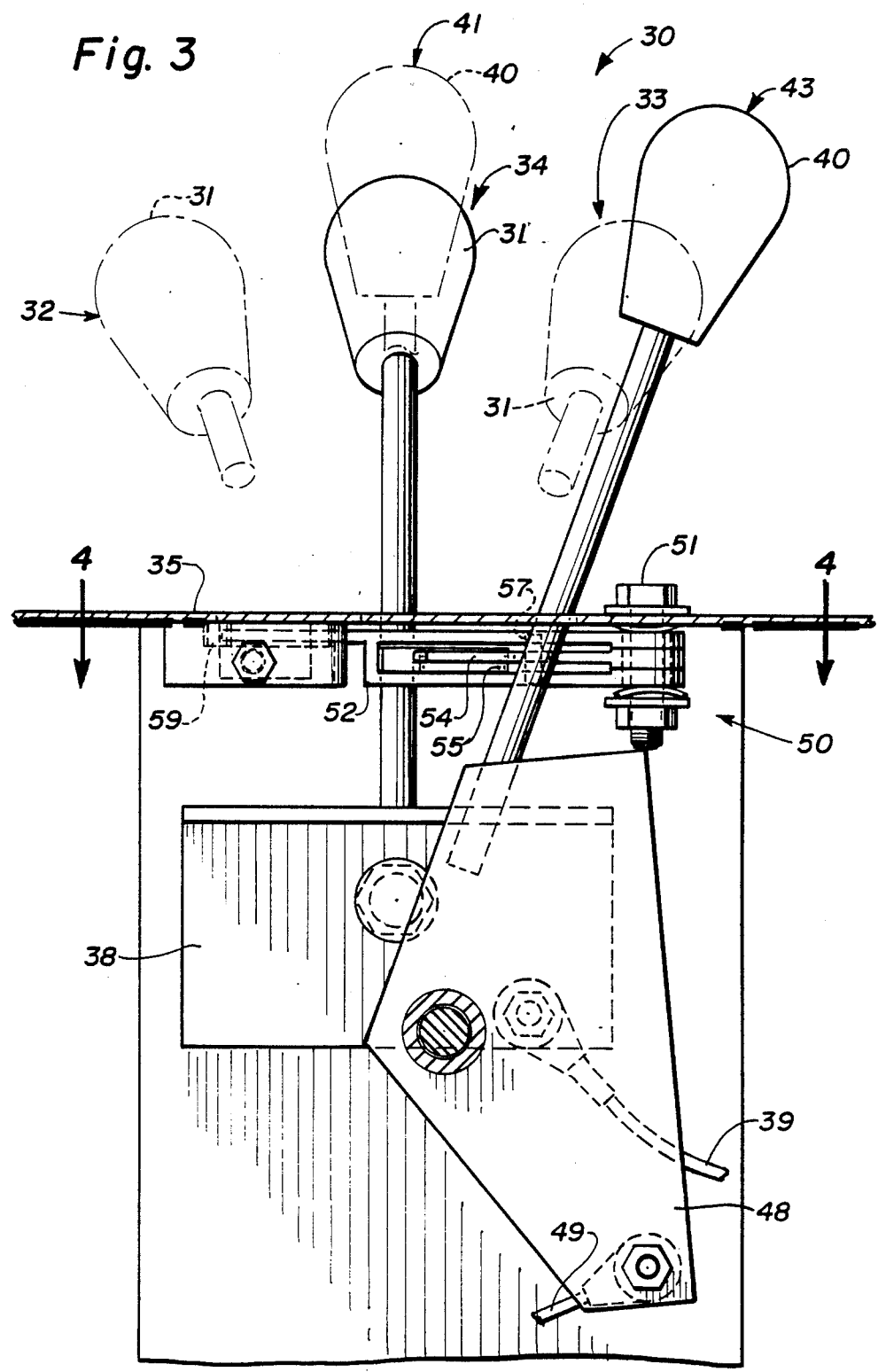
FIG. 3 is a partial cross-sectional view of the control mechanism taken along lines 3—3 of FIG. 2 to show a side elevational view of the throttle control lever and PTO engagement control lever, the position of the throttle control lever being shown at the predetermined position for engaging the interlock to the PTO engagement control lever while the PTO control lever is shown in the on position, the movements of the throttle control lever and the PTO engagement control lever being shown in phantom.

Referring now to FIGS. 1–3, the control mechanism 30 positioned in the operator's cab 11 to permit the remote control of both the throttle 16 of the engine 15 and the engagement control 25 of the power-takeoff assembly 20, can best be seen. The control mechanism 30 includes a throttle control lever 31 movable within a slot 36 formed in a control panel 35 between a slow or idle position 32, shown in phantom in FIG. 3, and a fast or high-speed position 33, also shown in phantom in FIG. 3, wherein the control lever 31 is positioned at the opposing end of the slot from the slow position 32. At a preselected position 34, the throttle control lever 31 moves the throttle 16 to a position wherein the engine 15 is operated at a predetermined speed of operation above which it is not desirable to permit the power-takeoff assembly 20 to be engaged. The control lever 31 is connected to a pivot plate 38 having a cable 39 attached thereto and interconnected with the throttle 16 to effect movement thereof.

The control mechanism 30 also includes a PTO control lever 40 connected to a pivot plate 48 having a cable 49 attached thereto and extending for connection with the engagement control 25 to effect movement thereof to turn the power-takeoff assembly on or off. The PTO control lever 40 is movable within a slot 46 formed in the control panel 35 between an off position 41, shown in phantom in FIG. 3, and an on position 43, shown in solid lines in FIG. 3. The movement of the PTO control lever 40 from the off position 41 to the on position 43 effects engagement of the power-takeoff assembly 20 to permit the transfer of rotational power from engine 15 through the transmission 18 to the implement (not shown) operatively connected to the output shaft 23.

Referring now to FIGS. 2-7, it can be seen that the control mechanism 30 is also provided with an interlock clip 50 positioned between the throttle control lever 31 and the PTO control lever 40 for engagement therewith. The interlock clip 50 includes a first member 52 and a second member 54 pivotally supported from the control panel 35 by a pivot bolt 51. The first member 52 has a spring 55 affixed thereto and engageable with the second member 54 to urge a pivotal movement of the second member 54 away from the first member 52. A limit pin 57 affixed to the first member 52 and movable within a slot 58 formed in the second member 54 limits the extent of movement of the second member 54 relative to the first member 52. The spring 55 is collapsible to permit a movement of the second member 54 toward the first member 52. A second spring 59 is mounted on the control panel 35 for engagement with the first member 52 to urge the first member 52 toward engagement with the throttle control lever 31. The spring 59 is yieldable to permit movement of the first member 52 away from the throttle control lever 31.

For compactness, the second member 54 is constructed to be retractable within the body of the first member 52 when the second member 54 is rotated toward the first member 52. The first member 52 is provided with a cam surface 53 engageable with the throttle control lever 31 to effect pivotal movement of the first member 52 about its pivot 51 away from throttle control lever 31 as will be described in greater detail below. The second member 54 is constructed such that the positioning thereof into the path of movement of the PTO control lever 40, when the PTO control lever 40 is in the off position 41, the PTO control lever 40 will engage a stop 56 to prevent movement of the PTO control lever 40 out of the off position 41.

Figure 4:
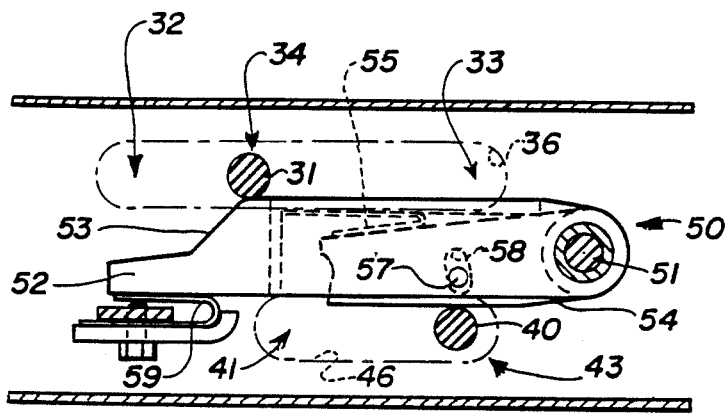
FIG. 4 is a cross-sectional view of the control mechanism taken along lines 4—4 of FIG. 3 to provide a top-plan view of the interlock clip interengaging the throttle control lever and the PTO engagement control lever.
Figure 5:
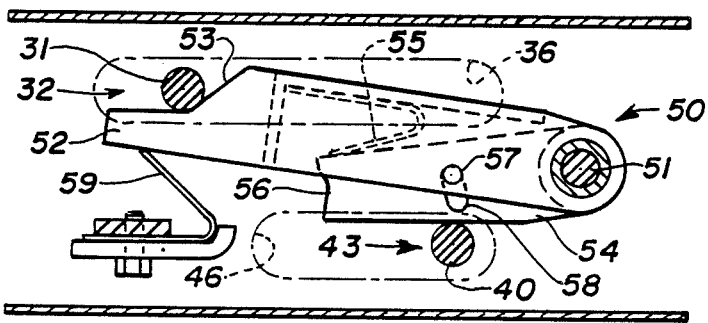
FIG. 5 is a view similar to that of FIG. 4 except that the throttle control lever has been moved into the slow position.
Figure 6:
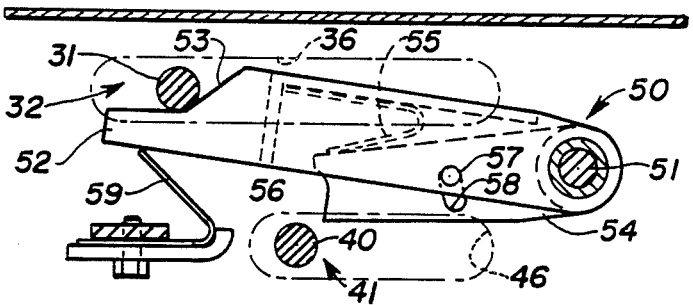
FIG. 6 is a view similar to those of FIGS. 4 and 5 with the throttle control lever being moved into the slow position and the PTO engagement control lever being moved to the off position.

The operation of the interlock clip 50 to limit the engagement of the power-takeoff assembly 20 can best be seen in FIGS. 3–7. Referring first to FIG. 6, it can be seen that the positioning of the throttle control lever 31 in its slow position 32 permits the first member 52 of the interlock clip 50 to be urged into engagement therewith by the second spring 59. The spring 55 urges the second member 54 away from the first member 52 to the extent permitted by the limit pin 57; however, the PTO control lever 40 is movable within the slot 46 without engagement with the stop 56 of the second member 54 allowing the PTO control lever 40 to be moved from the off position 41 to the on position 43 for engagement of the power-takeoff assembly 20.

Accordingly, the positioning of the throttle control lever 31 at or near the slow position 32 slows the speed of operation of the engine 15 to an acceptable level for efficient engagement of the power-takeoff assembly 20 without requiring an oversized PTO clutch (not shown). As a result, the movement of the PTO control lever 40 is unrestricted by the interlock clip 50 when the throttle control lever 31 is at or near the slow position 32. As can be seen comparing FIGS. 5 and 6, the PTO control lever 40 is free to move within the slot 46.

The movement of the throttle control lever 31 to the preset position 34 corresponds to a predetermined speed of operation of the engine 15, due to a corresponding movement of the throttle 16, at a speed of operation deemed unacceptable for the efficient engagement of the power-takeoff assembly 20. The movement of the throttle control lever 31 from the slow position 32 to the preset position 34 causes the throttle control lever 31 to engage the cam surface 53 on the first member 52, and effect a subsequent pivotal movement of the first member 52 away from the throttle control lever 31 into a lockout position, compressing the second spring 59.

Figure 7:
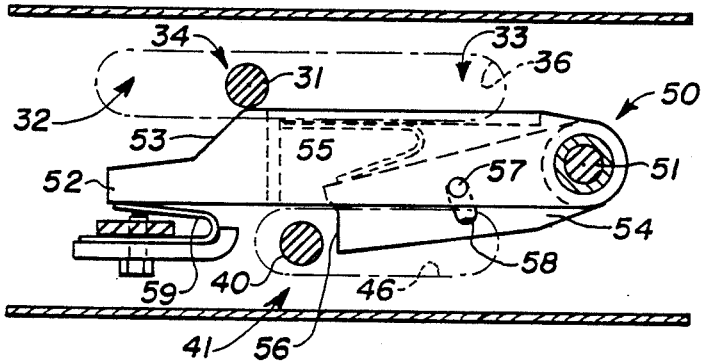
FIG. 7 is a view similar to those of FIGS. 4–6 with the throttle control lever moved to the predetermined position effecting a movement of the interlock clip to restrain movement of the PTO engagement control lever from the off position.

If the PTO control lever 40 is in its off position 41 when the throttle control lever 31 is moved to its preset position 34, as depicted in FIG. 7, the spring 55 transfers the pivotal movement enduced into the first member 52 by the throttle control lever 31 to the second member 54 which positions the second member 54 into a lockout position within the path of movement of the PTO control lever 40. Any subsequent attempts to move the PTO control lever 40 from the off position 41 to the on position 43 will cause the PTO control lever 40 to engage with a stop 56 on the second member 54 and prevent the movement of the PTO control lever 40 from the off position 41. Accordingly, the interlock clip 50 will prevent a subsequent engagement of the power-takeoff assembly 20 after the throttle 16 has been moved to cause an operation of the engine 15 at a speed of operation greater than a predetermined limit.

Under conditions where the PTO control lever 40 has been previously moved from the off position 41 into the on position 43 prior to the movement of the throttle control lever 31 to the preset position 34, as depicted in FIGS. 3 and 4, the second member 54 will impact into the PTO control lever 40 and effect a collapsing of the spring 55 when the first member 52 is pivotally moved away from the throttle control lever 31, collapsing the second spring 59. Accordingly, the interlock clip 50 does not prevent a continued operation of the power-takeoff assembly 20 when the throttle 16 is moved to operate the engine 15 at a speed of operation greater than the predetermined limit.

However, once the throttle control lever 31 has been moved to the preset position 34 or any position between the preset position 34 and the fast position 33, a movement of the PTO control lever 41 from the on position 43 to the off position 41 will permit the second member 54 to pivotally move relative to the first member 52, as urged by the spring 55, and place the stop 56 into the path of movement of the PTO control lever 40, thereby preventing a re-engagement of the power-takeoff assembly 20 until the throttle control lever 31 has been returned to a position between the preset position 34 and the slow position 32, whereupon the second member 54 will be rotated out of the path of movement of the PTO control lever 40 as depicted in FIG. 6.

In operation, the operator of the tractor 10 pulling an implement (not shown) detachably connected to the hitch 29 and operably connected to the output shaft 53 of the power-takeoff assembly 20 can effect a transfer of rotational power from the engine 15 to the implement (not shown) by throttling the engine 15 down to an acceptable level, as shown in FIG. 6, and then moving the PTO lever 40 from the off position 41 into the on position 43, as shown in FIG. 5, moving the engagement control 25 to engage the power-takeoff assembly 20 for the transfer of rotational power from the engine 15 to the attached implement (not shown).

Once the PTO control lever 40 has been moved into the on position 43 and the implement (not shown) is being operated, the subsequent moving of the throttle control lever 31 to the preset position 34 or beyond to the fast position 33 will not effect the operation of the power-takeoff assembly 20, as shown in FIG. 4. However, the movement of the PTO control lever 40 from the on position 43 back to the off position 41, while the throttle control lever 31 is between the preset position 34 and the fast position 33, permits the second member 54 to be pivotally moved into the path of movement of the PTO control lever 40 in its slot 46, as shown in FIG. 7. Accordingly, any re-engagement of the power-takeoff assembly 20 will require a movement of the throttle control lever 31 back to the slow position 32 as shown in FIG. 6, whereupon the PTO control lever 40 can be moved back to the on position 43.

By limiting the speed of operation of the engine 15 for engagement of the power-takeoff assembly 20, the power-takeoff assembly 20 can be designed with a clutch (not shown) to more efficiently handle the engagement of the power-takeoff assembly 20. One skilled in the art will readily realize that an electronic control could be provided to monitor the actual engine speed and permit engagement of the PTO clutch only when the engine speed is below a preset value. Such an electronic device, would be the equivalent of the mechanical interlock described above.

By way of specific example, the throttle control lever 31 at the slow position 32 would idle an engine having a maximum rated engine speed of 2150 RPM at the fast position 33. The throttle control lever 31 would first engage the cam surface 53 of the first member 52 when the engine is operated at about 1000 RPM. At the preset position 34, where the throttle control lever 31 has pivotally moved the first member into a lockout position compressing the spring 59, the predetermined speed of operation of the engine is about 1300 RPM above which engagement of the PTO clutch is undesirable.

It will be understood that changes in the details, materials, steps, and arrangements of parts which have been described and illustrated to explain the nature of the invention with occur to and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention. Accordingly, the following claims are intended to protect the invention broadly as well as in the specific form shown.

Having thus described the invention, what is claimed is:

1. In a tractor having a frame supported by ground-engaging wheels mobilely supporting said frame over the ground; an engine supported by said frame to provide operative power for said tractor, said engine having a throttle operatively associated therewith to vary upon movement thereof the speed of operation of said engine; a power-takeoff means selectively operatively engageable with said engine for the selective provision of rotational power to an output shaft engaged with an implement connected to said tractor; and control means operatively connected to said throttle and to said power-takeoff means to permit the remote operative control thereof, an improved control means comprising:

an interlock means operatively associated with said throttle and with said power-takeoff means to prevent an operative engagement of said power-takeoff means with said engine for the delivery of rotational power from said engine to said attached implement whenever said engine is operating at a speed of operation greater than a predetermined speed of operation.

2. The tractor of claim 1 wherein said interlock means isoperatively connected to said throttle which is movable through a predetermined position located between a slow position in which said engine operates at a slow speed of operation and a fast position in which said engine operates at a fast speed of operation, said interlock means preventing engagement of said power-takeoff means when said throttle is positioned between said predetermined position and said fast position.

3. The tractor of claim 2 wherein said control means further includes a movable throttle control lever operatively connected to said throttle to effect movement thereof between said slow and said fast positions, and a movable PTO control lever operatively connected to said power-takeoff means to control the selective engagement thereof with said engine between an on position in which the power-takeoff means is engaged with said engine and an off position in which said power-takeoff means is disengaged from said engine.

4. The tractor of claim 3 wherein said interlock means includes a lockout assembly operatively associated with said throttle control lever and said PTO control lever such that said PTO control lever is restrained from moving from said off position to said on position when said throttle control lever has moved to a position corresponding to a movement of said throttle between said predetermined position and said fast position.

5. The tractor of claim 4 wherein said lockout assembly will permit any desired movement of said throttle control lever when said PTO control lever is in said on position, said lockout assembly permitting the movement of said PTO control lever from said on position to said off position irrespective of the position of said throttle control lever.

6. The tractor of claim 5 wherein said lockout assembly includes a pivotally mounted clip having a first member engageable with said throttle control lever and a second member engageable with said PTO control lever, said first member being pivotally movable into a lockout position when said throttle control lever is moved to a position corresponding to said predetermined position of said throttle, the movement of said first member into said lockout position effecting a corresponding pivotal movement of said second member into a lockout position which restrains movement of said PTO control lever from said off position, said first member being cooperable with a biasing means for urging said first member toward engagement with said throttle control lever.

7. The tractor of claim 6 wherein said clip further includes a spring interengaging said first and second members to urge pivotal movement of said first and second members in opposing directions, said clip further including a limit means restricting the amount of movement of said second member relative to said first member.

8. The tractor of claim 7 wherein said first member includes a cam surface engageable with said throttle control lever to effect pivotal movement of said first member to said lockout position by the movement of said throttle control lever from said slow position toward said fast position when reaching the position corresponding to said predetermined position of said throttle, the pivotal movement of said first member to said lockout position effecting a corresponding movement of said second member into said lockout position when said PTO control lever is in said off position, said second member being blocked from moving into said lockout position when said PTO control lever is in said on position, said spring yielding to permit relative movement between said first and second members when said second member is blocked by said PTO control lever.

9. The tractor of claim 8 wherein said spring causes said second member to move into said lockout position when said PTO control lever is moved from said on position to said off position after said first member has been moved into said lockout position.

10. The tractor of claim 9 wherein said clip is detachably supported from said frame by a bolt serving as the pivot axis for the pivotal movement of said first and second members.

11. A control mechanism for a tractor having an engine supported from a wheeled frame to provide operational power for said tractor, said engine including a movable throttle operable to vary the speed of operation of said engine upon manipulative movement thereof, said tractor further having a power-takeoff assembly operatively connected to said engine to provide operative rotational power to an output shaft supported from said frame, said power-takeoff assembly including a movable engagement control for controlling the on/off operation of said power-takeoff assembly, comprising:

a throttle control lever operatively connected to said engine throttle to effect movement thereof for varying the speed of operation of said engine, said throttle control lever being movable from a slow position in which said engine in operated at a slow speed to a fast position in which said engine is operated at a fast speed, through a preset position corresponding to a predetermined speed of operation of said engine between said slow and said fast speeds;

a PTO control lever operatively connected to said power-takeoff engagement control to effect movement thereof to control operation of said power-takeoff assembly, said PTO control lever being movable between an off position in which said power-takeoff assembly is disengaged and an on position in which said power-takeoff assembly is operatively connected with said engine; and an interlock clip supported by said frame for engagement with both said throttle control lever and said PTO control lever, said interlock clip being operable to block movement of said PTO control lever from said off position when said throttle control lever is at said preset position, said interlock clip permitting unrestricted movement of said throttle control lever irrespective of the position of said PTO control lever, while permitting unrestricted movement of said PTO control lever from said on position irrespective of the position of said throttle control lever.

12. The control mechanism of claim 11 wherein said interlock clip has a first member engageable with said throttle control lever and a second member engageable with said PTO control lever, said first member being pivotally movable into a lockout position when said throttle control lever is moved to said preset position, the movement of said first member into said lockout position effecting a corresponding pivotal movement of said second member into a lockout position which restrains movement of said PTO control lever from said off position.

13. The control mechanism of claim 12 wherein said interlock clip further includes a spring interengaging said first and second members to urge pivotal movement of said first and second members in opposing directions, said clip further including a limit means restricting the amount of movement of said second member relative to said first member.

14. The control mechanism of claim 13 wherein said first member includes a cam surface engageable with said throttle control lever to effect pivotal movement of said first member to said lockout position by the movement of said throttle control lever from said slow position to said preset position, the pivotal movement of said first member to said lockout position effecting a corresponding movement of said second member into said lockout position when said PTO control lever is in said off position, said second member being blocked from moving into said lockout position when said PTO control lever is in said on position, said spring yielding to permit relative movement between said first and second members when said second member is blocked by said PTO control lever.

15. The control mechanism of claim 14 wherein said spring causes said second member to move into said lockout position when said PTO control lever is moved from said on position to said off position after said first member has been moved into said lockout position.

16. The control mechanism of claim 14 further comprising a second spring engageable with said first member to urge said first member toward engagement with said throttle control lever.

* * * * *